(12) United States Patent
Boehmer

(10) Patent No.: US 11,721,866 B2
(45) Date of Patent: Aug. 8, 2023

(54) RECTANGULAR HOUSING

(71) Applicant: GEDIA GEBRÜDER DINGERKUS GMBH, Attendorn (DE)

(72) Inventor: Andreas Boehmer, Lennestadt (DE)

(73) Assignee: GEDIA GEBRUEDER DINGERKUS GMBH, Attendorn (DE)

( * ) Notice: Subject to any disclaimer, the term of this patent is extended or adjusted under 35 U.S.C. 154(b) by 300 days.

(21) Appl. No.: 17/257,947

(22) PCT Filed: Jun. 13, 2019

(86) PCT No.: PCT/DE2019/100544
§ 371 (c)(1),
(2) Date: Jan. 5, 2021

(87) PCT Pub. No.: WO2020/038516
PCT Pub. Date: Feb. 27, 2020

(65) Prior Publication Data
US 2021/0288368 A1 Sep. 16, 2021

(30) Foreign Application Priority Data

Aug. 22, 2018 (DE) .......................... 102018120466.3

(51) Int. Cl.
*H01M 50/209* (2021.01)
*H01M 50/184* (2021.01)
(Continued)

(52) U.S. Cl.
CPC ......... *H01M 50/209* (2021.01); *H01M 50/15* (2021.01); *H01M 50/184* (2021.01); *H01M 50/224* (2021.01); *H01M 50/262* (2021.01); *H01M 50/276* (2021.01); *H01M 2220/20* (2013.01)

(58) Field of Classification Search
None
See application file for complete search history.

(56) References Cited

U.S. PATENT DOCUMENTS 9,859,532 B2 * 1/2018 Balk .................... H01M 50/231

FOREIGN PATENT DOCUMENTS

| DE | 101016209853 A | 12/2017 |
|----|----------------|---------|
| FR | 2962443 A | 1/2012 |
| JP | 2013133044 A | 7/2013 |

* cited by examiner

Primary Examiner — Wyatt P McConnell
(74) Attorney, Agent, or Firm — Andrew Wilford

(57) ABSTRACT

The invention relates to a cuboid-shaped housing (1) for receiving a plurality of cuboid-shaped batteries (2) which are intended as an energy source for the traction drive of motor vehicles, in particular automobiles, the housing (1) having a bottom wall (3), first and second side walls (4, 5) peripherally connected to said bottom wall, and a top (6) connected detachably to the free ends of the side walls (4, 5), wherein: the housing (1) is a sheet metal component folded from a sheet metal panel; the side walls (4, 5) are folded in the same orientation at right angles to the bottom wall (3), the free ends of which are folded outwardly at right angles oriented away from the housing interior, and a narrow edge region is turned in the opposite direction such that a double layer (7) is formed; the exposed upper edge region (8) of the double layer (7) is connected in a sealed manner to the top (6); and the cut edge (10) of the edge region lies within the sealed housing region.

10 Claims, 2 Drawing Sheets

(51) Int. Cl.
*H01M 50/15* (2021.01)
*H01M 50/262* (2021.01)
*H01M 50/224* (2021.01)
*H01M 50/276* (2021.01)

RECTANGULAR HOUSING

CROSS REFERENCE TO RELATED APPLICATIONS

This application is the US-national stage of PCT application PCT/DE2019/100544 filed 13 Jun. 2019 and claiming the priority of German patent application 102018120466.3 itself filed 22 Aug. 2018.

FIELD OF THE INVENTION

The invention relates to a parallepipedal housing for holding a large number of square batteries for use as an energy source for the propulsion of motor vehicles, especially automobiles, the housing having a floor panel, first and second side panels extending up from edges of the floor panel and having upper edges releasably connected to a cover.

Such housings are widely known in the prior art.

The housings have a parallepipedal, shell-like shape and are preferably tightly closed with a cover. The housing holds batteries usable as an energy source that are for the drive and that must be protected from external influences, such as liquid and dirt, and also from forces that act on the housing in the event of a crash. For this reason particularly high demands are placed on the stability and tightness of the housing. In addition, it is desirable that the walls of the parallepipedal housing should be at right angles to each other and the corner and edge radii to be made particularly small in order that the usually parallepipedal batteries are held as much as possible in a space-saving manner in the housing.

Deep-drawn housings are for example known to be made of die-cast aluminum as are housings constructed from profiles and sheets.

A disadvantage of deep-drawn housings and of die-cast housings are the required casting angles that are created by the manufacturing facility are required by the manufacturing process. Thus an optimal and space-saving arrangement of the batteries is not provided in the housing.

A disadvantage of multipart housings is that they consist of a large number of individual components. The individual components must be joined together, which is particularly time-consuming, since a large number of joints must be created and must also have a high level of fluid tightness. If the housing is made of steel, for example, there is also the risk of corrosion. Such housings are protected against corrosion by being coated with an anti-corrosion layer, e.g. paint. However, due to edge wear of the coating of the housing, corrosion will occur and the housing will suffer damaged. As a result, the housing is not durable and stable. Contamination and fluid entry is the result. In addition, the housing then does not have sufficient strength to protect the batteries.

Object of the Invention

The object of the invention is therefore to provide a stable and durable housing that serves for holding batteries and that is inexpensive to manufacture and at the same time has sufficient tightness, as well as a space-saving arrangement of the batteries.

SUMMARY OF THE INVENTION

To attain this object, the invention proposes that the housing is a made of bent sheet metal and has side panels folded perpendicular to the floor panel and having in turn outer edges bent at right angles to the outside, facing away from the interior of the housing, and a narrow edge strip bent back as an upper layer in the opposite direction, so that a double-layer flange is formed whose exposed upper layer is sealed to the cover, the cut edge of the upper layer lying within the sealed housing area.

This way, the housing is a bent single piece of sheet metal, it is possible a square one to create housings with particularly small edge radii. At the same time the side panels str aligned at right angles to the floor panel. This makes for a space-saving, arrangement of the batteries in the housing that fits the housing space.

The outer edges of the side panels are bent to the outside, extending away from the interior of the housing and form a flange, with a narrow edge strip bent back in the opposite direction, toward the interior of the housing, to form an upper layer of the flange. This creates a double-layer flange that reinforces the outer edge of the housing and makes the housing particularly rigid and stable. The upper flange layer is sealed to the cover, so that liquid or contamination cannot get into the housing. The edges of the side surfaces are cut edges when making the sheet metal blank for the housing. The cut edges of the side panels are turned over to form the double-layer flange so that the cut edge of the upper or of respective side panel made of sheet metal turned over toward the interior of the housing is sealed by the cover and in the sealed area of the housing. This prevents corrosion of the cut edges, even if the housing, for example a steel housing coated with a corrosion protection layer and where the cut edge is at risk of corrosion due to exposure, is sealed and protected from external influences such as moisture. The edge of the double-layer flange lying outside the sealed area is formed by a rounded fold, which increases the edge radius and prevents the edge wear so that this area is protected from corrosion.

Preferably provided exposed upper layer of the double-layer flange forms a support for a seal that is between this flange face and the cover, the cut edge of the flange face lying within the housing area sealed off by the seal and cover.

With a seal between the upper layer, i.e. the inwardly folded part of the double-layer flange, and the cover the housing is particularly well sealed so that moisture, liquid or contamination is prevented from entering the housing.

Preferably the double-layer flanges meet at the corners have at mitered edges as a miter joint and are tightly joined at these mitered edges.

The double-layer flanges of the side panels thus abut one another in corners near the corners of the housing and are tightly joined in these corners. The double-layer flanges are formed by the upper flange layer and the lower flange layer, and the double-layer flanges or the flange layers each have mitered end edges in the corners. The diagonal or mitered end edges of the double-layer flange meet at the corners without overlap. This enables a clean and high-quality joint to be produced. Also the top face of the double-layer flanges is particularly flat and smooth, so that parts of the cover and/or a seal on the upper layer lies evenly on the surface and the housing interior is optimally sealed. Laser welding can for example be used to join the mitered end edges.

In this way a fluid tight connection is formed between the upper layers and between the lower flange layers at the corner where the double-layer flanges meet, so that liquid cannot penetrate into the housing through the corners.

It is preferably provided that the upper layer of the double-layer flange each have a straight mitered end edge, and that the lower layer of the double-layer flange each has a mitered end edge provided with a formation that interlocks with the lower layer of the end edge it abuts at the corner, so that the lower adjacent mitered end edges of the lower flange layers are positively interlocked with each other.

The side panels are bent out from the floor panel and are joined in the corners of the housing. Likewise, the corners of adjacent double-layer flanges are joined together.

In order to make in each of these areas joint connections with a particularly good quality, it is necessary to keep the gap between the parts to be connected small. The edges of the lower layer of each double flange are hooked together at the corners before the side panels and/or the corners of the double-layer flanges are joined permanently together. For this purpose, the lower flange layers have a mitered end edge with at least one coupling formation. By hooking together the complementary interlocking formations, the side panels and the double-layer flanges are held in position, with the end edges of the upper layer closely adjacent with only a small gap remaining. Then the side panels or the corners of the double-layer flange, are joined to form a joint connection that, due to the small gap, is of particularly good quality. Laser welding in particular requires a particularly small gap between the parts to be connected.

The straight mitered end edges of the upper layer can be set close together and joined without overlap. This allows a clean and high-quality joint connections are made.

It is preferred that at least the side panels are tightly joined together at the corners, preferably by laser welding.

In each corner of the housing two adjacent side panels are closely juxtaposed and permanently joined to each other, preferably by laser welding. The upper and lower layers of the double-layer flanges are also preferably fixedly united at the corners.

This way the housing is particularly tight and neither liquid nor dirt can penetrate into the housing via the corners or the double-layer flanges.

Preferably an outer edge of the cover is detachably fixed to the double-layer flange, and preferably the cover is a sheet-metal component with an inwardly folded double-layer outer edge with which the cover rests on the double-layer flange of the sidewalls, the seal being between the upper layer of the double-layer housing flange and the inwardly folded outer edge of the cover and the cut edges of the folded outer edge of the cover lying within the housing area that is sealed by the seal and the cover.

The inwardly turned outer edge of the cover ensures that the cut edge of the sheet-metal cover is inside the sealed housing area, creating the advantage that the edge of the cover is protected from corrosion, even if the cover is for example coated with an anti-corrosion layer and the edge is due to edge trimming at risk of corrosion, since the cut edge is protected in the sealed area from external influences, for example, moisture.

Those edges of the cover lying outside the sealed area are rounded such that their edge radius is enlarged and edge wear is prevented, so this area is protected against corrosion.

BRIEF DESCRIPTION OF THE DRAWING

An embodiment of the housing according to the invention in shown in the figures and explained in more detail below. Therein.

SPECIFIC DESCRIPTION OF THE INVENTION

Figure 1:
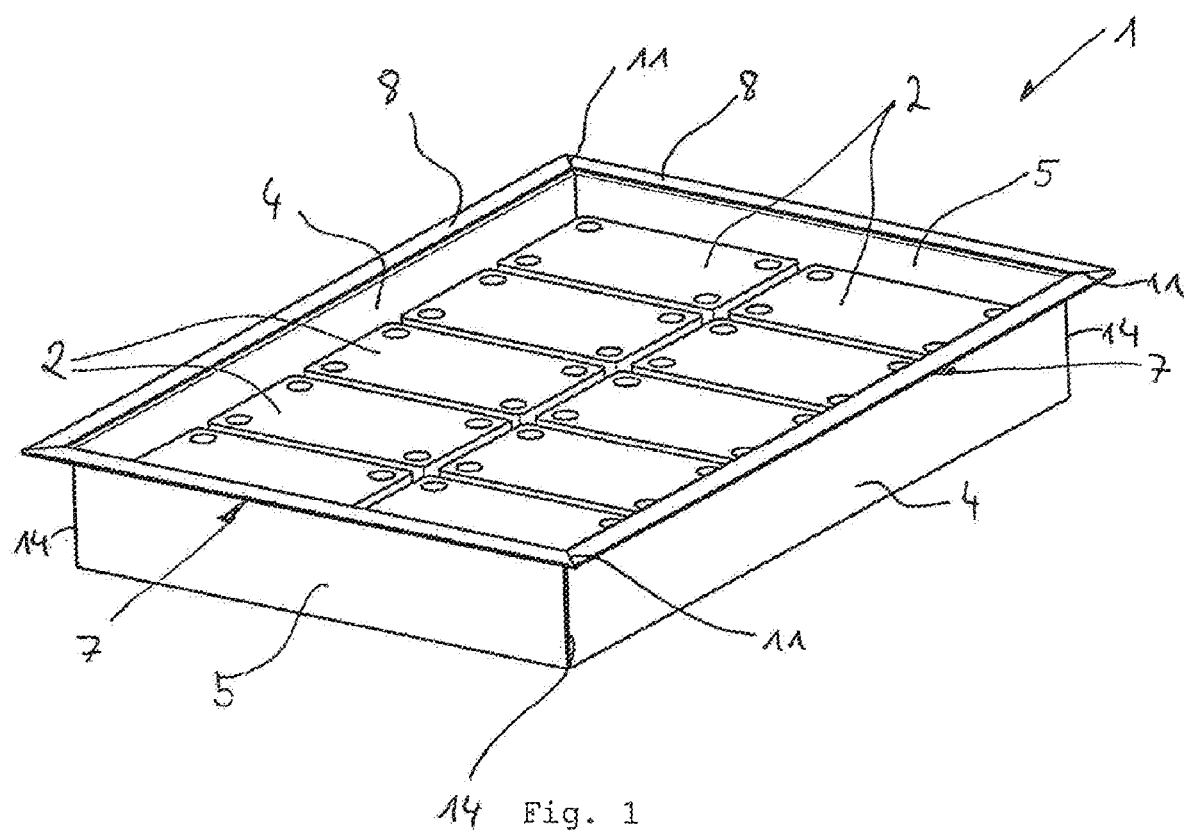
FIG. 1 shows a housing according to the invention in perspective view.

FIG. 1 shows a parallelepipedal housing 1 for holding a plurality of batteries 2 for use as an energy source for powering a motor vehicle, in particular an automobile, the housing 1 having a floor panel 3 connected at outer edges to circumferential first and second side panels 4 and 5 whose free edges are releasably connected to a cover 6. The cover 6 is not shown in FIG. 1.

The housing 1 is made of a single piece of bent sheet metal, and upper edges of the side panels 4 and 5 are folded out at right angles parallel to the floor panel 3. This makes it possible to create a parallepipedal housing 1 with particularly small edge radii to form a space-saving arrangement of the batteries 2 in the housing 1.

The upper edges of the side panels 4.5 are bent out at right angles to the outside from the interior of the housing and then back to form a flange 7. A narrows strip area is bent back in the opposite direction, toward the inside of the housing, so that the flange 7 is formed of two layers. This double-layer flange 7 reinforces and stiffens the upper edge of the housing 1.

Figures 3A, 3B:
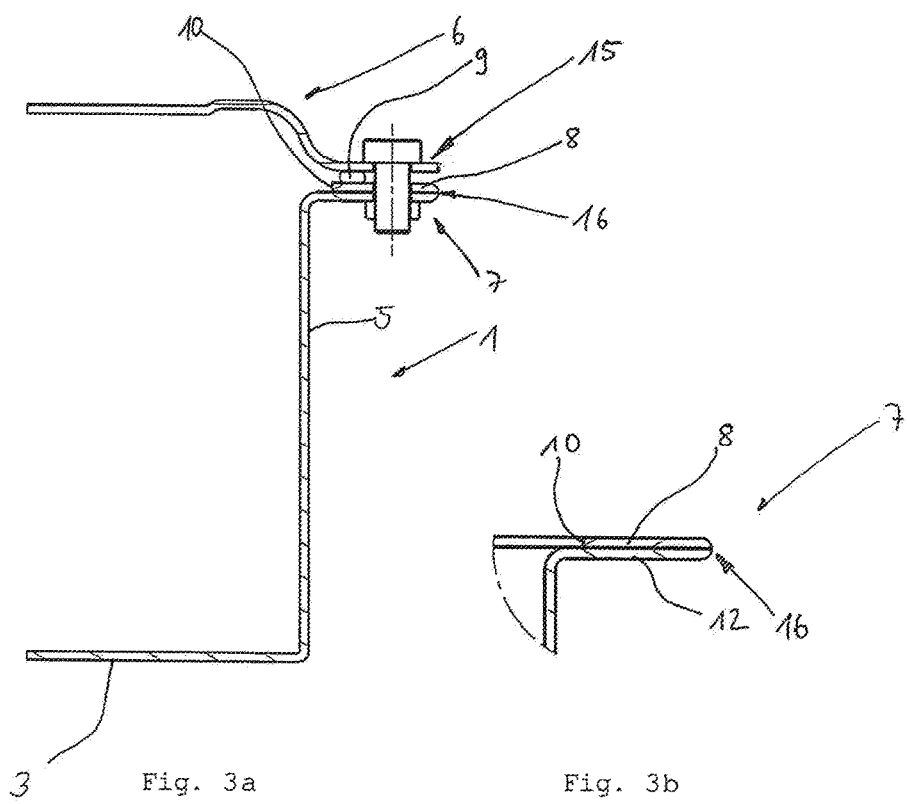
FIGS. 3A and 3B are side and cross-sectional detail views of a housing.

The outer edges of the side panels 4 and 5 are formed as cut edges 10 when cutting the sheet metal used for the housing 1. One cut edge 10 is shown in FIG. 3A and shown enlarged in FIG. 3B. The cut edges 10 of the flanges lie within a housing area that is secured by a seal 9 and the cover 6 as shown in FIG. 3A. The cut edges 10 are thus protected from corrosion, as they are sealed away and protected from outside influences, such as liquids and dirt. Positioning the cut edges 10 in the sealed area is particularly advantageous for corrosion protection, for example when a protective lacquer is provided on the steel from which the housing 1 is cut, because due to the so-called edge cutting (lacquer alignment) the cut edges 10 despite the coating are at risk of corrosion. Edges 16 lying outside the sealed area of the double-layer flange 7 are rounded due to the fold, so the edge radius is enlarged and edge damage is prevented, so this area is not at risk of corrosion.

The housing 1 is closed by the seal 9 and the cover 6 as shown in FIGS. 3A and 3B. An exposed upper layer 8 of the double-layer flange 7 forms a support for the seal 9 between the upper layer 8, that is the part of the double-layer flange 7 that is turned over toward the inside of the housing, and the cover 6. This prevents the entry of moisture, water, and dirt into the housing 1.

The folded-out edges of the side panels 4 and 5 are fitted tightly against one another in the corners 14 of the housing 1.

The corners of adjacent double-layer flanges 7 are also joined together. The double-layer flanges 7 each have the upper layer 8 and the lower layer 12, and the upper and lower layers 8 and 7 of each of the double-layer flanges 7 are level with the respective upper and lower layers 8 and 12 of the adjacent double-layer flange 7 at the corners 14 and meet in tight surface contact at angled mitered end edges 11 and 11'. As a result, the housing 1 is particularly tight and neither liquids nor dirt can go over or through the corners into the housing 1. Welds join the mitered end edges 11 and 11' of the butting double-layer flanges 7.

To ensure joints of particularly good quality, it is necessary to to keep the gap between the parts to be connected small.

Figure 2:
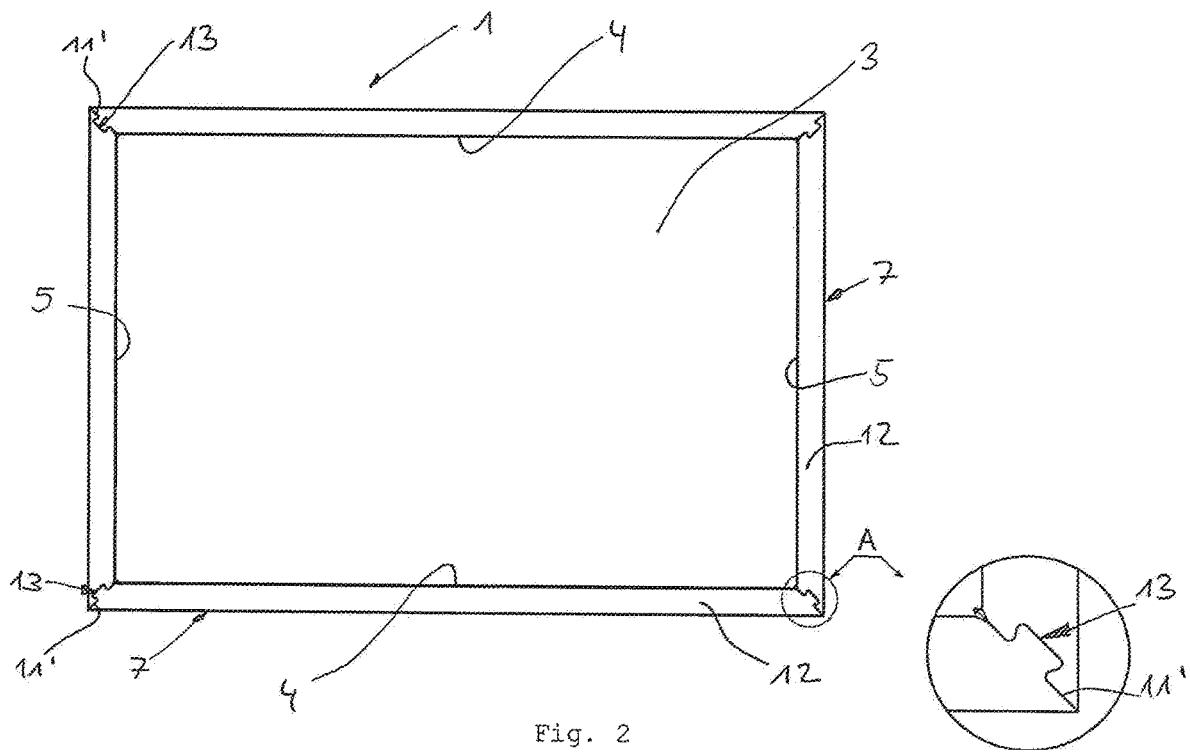
FIG. 2 shows the housing in a view from below and the detail A of the housing.

The lower layers 12 of the double-layer flanges 7 have mitered end edges 11' that have interfitting complementary coupling formation 13 that lock together the lower layers before the parts are permanently joined. In FIG. 2 the underside of the housing 1 and the lower layer 12 is shown, and the mitered end edges 11' are shown in large scale with the coupling formations 13 and in detail A of FIG. 2.

The upper layer 8 of the double-layer flange 7, however, has a respective oblique section with a straight mitered end edge 11, the straight mitered end edges 11 of the upper layers 8 are closely juxtaposed and joined together without overlap. This allows a clean and high quality joint to be established.

The mitered end edges 11' of the lower layers 12 lying next to each other have the coupling formations 13 that are hooked into one another before the side panels 4 and 5 and the corners of the double-layer flanges 7 are joined permanently together. By hooking together the complementary formations 13, the side panels 4 and 5 and the double-layer flanges 7 are connected together at the corners of the double-layer flanges 7 and held in position with their end edges adjacent and only a separated by a small gap. When the side panels 4 and 5 or the corners of the double-layer flanges 7 are permanently interconnected, the small gap ensures that a joint is made that is of particularly good quality. Especially with laser welding it is necessary that a particularly small gap be left between the parts to be connected.

The cover 6 has an outer edge 15 releasably fixed to the double-layer flange 7 by a fastener, for example a screw as shown in FIGS. 3A and 3B.

An unillustrated embodiment has a cover 6 of sheet metal with an inwardly folded double-layer edge with which the cover 6 rests on the double-layer flange 7 of the side panels 4 and 5, with the seal 9 between the upper layer 8 of the double-layer flange 7 and the folded outer edge of the cover 6 and the cut edges of the folded edge region of the cover 6 within of the housing that is sealed by the seal 9 and the cover 6. This way the cover 6 is reinforced and stiffened in the edge region 15. The cut edges are such that the sealed housing is protected from external influences such as moisture and dirt and corrosion of the cut edges is prevented, even if the cover 6, for example is coated with a corrosion protection layer and the marginal edges 15 due to edge are at risk of corrosion due to edge wear.

The sealed area edge of the cover 6 lying outside the seal 0 forms a rounded edge of an enlarged edge radius, so that edge damage is prevented and corrosion is prevented.

The invention is not limited to the illustrated embodiment, but its scope is variable.

All individual and combination features disclosed in the description and/or drawing are considered essential to the invention.

The invention claimed is:

1. A housing with a parallepipedal shape to accommodate a variety of parallepipedal batteries for use as an energy source for the propulsion of a motor vehicle having an interior, the housing comprising:
a floor panel,
first and second side panels extending up from outer edges of the floor panel, and
a cover releasably connected to upper edges of the side panels, the housing being formed of bent sheet metal, the side panels being bent out at right angles in the same direction from the floor panel and having outer edges bent at right angles outward from the housing with edges strips bent back to form double-layer flanges having exposed upper layers that are sealed to the cover and that each have a cut edge lying within a sealed housing area.

2. The housing according to claim 1, further comprising:
a seal supported on the exposed upper layers of the double-layer flanges and lying between these upper layers and the cover, the cut edges of the upper layers of the flange lying within the sealed housing area sealed by the seal and the cover.

3. The housing according to claim 1, wherein the double-layer flanges meet in corners with mitered end edges as a miter joint and the mitered end edges are joined together.

4. The housing according to claim 3, wherein the mitered end edges of the upper layers of the double-layer flanges are oblique and straight.

5. The housing according to claim 4, wherein lower flange layers of the double-layer flanges have lower mitered end edges at least one which is formed with a coupling formation so that the lower mitered end edges of the lower flange layers are positively interlocked with each other.

6. The housing according to claim 1, wherein the side panels are joined together in corners.

7. The housing according to claim 1, wherein the cover is detachably fixed along an inwardly bent outer edge at a respective one of the double-layer flanges to the double-layer flanges of the side walls.

8. The housing according to claim 2, wherein the cover is a sheet-metal component with an inwardly folded double-layered outer edge with which the cover rests on the double-layer flanges of the side panels, the seal being between the upper layer of the double-layer flange and the folded double-layered outer edge of the cover and the cut edges of the upper layers of the folded double-layered outer edge of the cover lying within the sealed housing area that is sealed by the seal and the cover.

9. The housing according to claim 1, wherein the double-layer flanges meet at corners of the housing with mitered end edges of both the upper layers and lower layers, the mitered end edges of the upper layers being straight and spacedly juxtaposed at the corners, the mitered end edges of the lower layers being formed with complementary interlocking formations.

10. The housing according to claim 2, further comprising:
fasteners securing an outer edge of the cover to the double-layer flanges and compressing the seal between the cover and the double-layer flanges.

* * * * *